United States Patent
Park et al.

(10) Patent No.: US 11,021,134 B2
(45) Date of Patent: Jun. 1, 2021

(54) METHOD OF CONTROLLING SMART KEY

(71) Applicant: HYUNDAI MOBIS CO., LTD., Seoul (KR)

(72) Inventors: Jong Hyuk Park, Seoul (KR); Yong Hee Park, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 16/860,433

(22) Filed: Apr. 28, 2020

(65) Prior Publication Data
US 2020/0339066 A1    Oct. 29, 2020

(30) Foreign Application Priority Data

Apr. 29, 2019 (KR) .................. 10-2019-0050141
Apr. 29, 2019 (KR) .................. 10-2019-0050142

(51) Int. Cl.
| | | |
|---|---|---|
| B60R 25/20 | (2013.01) | |
| B60R 25/24 | (2013.01) | |
| G07C 9/00 | (2020.01) | |
| H04W 4/40 | (2018.01) | |
| H04B 17/318 | (2015.01) | |

(52) U.S. Cl.
CPC ........ *B60R 25/2072* (2013.01); *B60R 25/245* (2013.01); *G07C 9/00309* (2013.01); *H04B 17/318* (2015.01); *H04W 4/40* (2018.02); *G07C 2009/00341* (2013.01); *G07C 2009/00555* (2013.01); *G07C 2009/00769* (2013.01)

(58) Field of Classification Search
CPC .............. B60R 25/2072; B60R 25/245; G07C 2009/00341; G07C 2009/00555; G07C 2009/00769; G07C 9/00309; H04B 17/318; H04W 4/40
See application file for complete search history.

(56) References Cited

U.S. PATENT DOCUMENTS

| | | | | |
|---|---|---|---|---|
| 10,315,623 B2* | 6/2019 | Iwashita | ............... | B60R 25/245 |
| 2007/0200672 A1* | 8/2007 | McBride | ............... | B60R 25/245 |
| | | | | 340/5.72 |

FOREIGN PATENT DOCUMENTS

| | | |
|---|---|---|
| JP | 2004-137667 | 5/2004 |
| JP | 2016-089563 | 5/2016 |

* cited by examiner

*Primary Examiner* — Nader Bolourchi
(74) *Attorney, Agent, or Firm* — H.C. Park & Associates, PLC

(57) ABSTRACT

A method of controlling a smart key, including a low frequency (LF) receiver receiving an LF signal from a vehicle, a radio frequency (RF) transmitter transmitting an RF signal to the vehicle in response to the LF signal, a sensor unit sensing a motion, and a micro control unit controlling operations of the LF receiver, the RF transmitter, and the sensor unit, includes receiving, by the LF receiver, the LF signal from the vehicle and controlling, by the micro control unit, a turn-on/off operation of each of the LF receiver, the RF transmitter, and the sensor unit on the basis of the received LF signal.

19 Claims, 15 Drawing Sheets

CASE 1

CASE 2

CASE 3

CACE 4

CASE 5

CASE 6

METHOD OF CONTROLLING SMART KEY

CROSS-REFERENCE TO RELATED APPLICATIONS

This application claims priority from and the benefit of Korean Patent Application No. 10-2019-0050141, filed on Apr. 29, 2019 and Korean Patent Application No. 10-2019-0050142, filed on Apr. 29, 2019, which is hereby incorporated by reference for all purposes as if set forth herein.

BACKGROUND

Field

Exemplary embodiments relates to a smart key for vehicles.

Discussion of the Background

A smart key system denotes a system that is configured to perform functions such as locking or unlocking of a vehicle door, starting of a vehicle, and applying power by using low frequency (LF) and radio frequency (RF) communication between a smart key (a FOB key) of a driver (or a user) and a smart key unit (hereinafter referred to as an SMK unit) equipped in a vehicle.

The smart key acts as a vehicle key and uses a lithium ion battery rated at 3V. Various researches are being performed to decrease the battery consumption of the smart key.

In a method to decrease the battery consumption of the smart key, a sensor (for example, a vibration sensor) configured to sense a motion of the smart key is embedded into the smart key. Only when the sensor senses the motion of the smart key, a method of operating a specific function (for example, locking or unlocking of a vehicle door, starting of a vehicle, and applying of power) has been proposed.

In such a conventional method, because the sensor embedded into the smart key should normally (continuously) maintain a turn-on state, there is a limitation in decreasing battery consumption.

Also, the conventional method is vulnerable to hacking, such as a relay station attack (RSA).

The above information disclosed in this Background section is only for enhancement of understanding of the background of the invention and, therefore, it may contain information that does not constitute prior art.

SUMMARY

Accordingly, exemplary embodiments of the present invention provides a method of controlling a smart key, which may maximize an efficiency of a battery embedded into the smart key and prevent hacking such as an RSA.

In one general aspect, a method of controlling a smart key, including a low frequency (LF) receiver receiving an LF signal from a vehicle, a radio frequency (RF) transmitter transmitting an RF signal to the vehicle in response to the LF signal, a sensor unit sensing a motion, and a micro control unit controlling operations of the LF receiver, the RF transmitter, and the sensor unit, includes: receiving, by the LF receiver, the LF signal from the vehicle; and controlling, by the micro control unit, a turn-on/off operation of each of the LF receiver, the RF transmitter, and the sensor unit on the basis of the received LF signal.

In another general aspect, a method of controlling a smart key, including a low frequency (LF) receiver receiving an LF signal from a vehicle, a radio frequency (RF) transmitter transmitting an RF signal to the vehicle in response to the LF signal, a sensor unit sensing a motion, and a micro control unit controlling operations of the LF receiver, the RF transmitter, and the sensor unit, includes: receiving, by the LF receiver, the LF signal including a command message representing opening or closing of a vehicle door from the vehicle; and controlling, by the micro control unit, a turn-on/off operation of the sensor unit sensing a motion of the smart key on the basis of the LF signal.

In another general aspect, a method of controlling a smart key, including a low frequency (LF) receiver receiving an LF signal from a vehicle, a radio frequency (RF) transmitter transmitting an RF signal to the vehicle in response to the LF signal, a sensor unit sensing a motion, and a micro control unit controlling operations of the LF receiver, the RF transmitter, and the sensor unit, includes: receiving, by the LF receiver, the LF signal from the vehicle; and controlling, by the micro control unit, a turn-on/off operation of each of the LF receiver, the RF transmitter, and the sensor unit on the basis of a received signal strength indicator (RSSI) of the received LF signal and a command message which represents opening or closing of a vehicle door and is included in the received LF signal.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
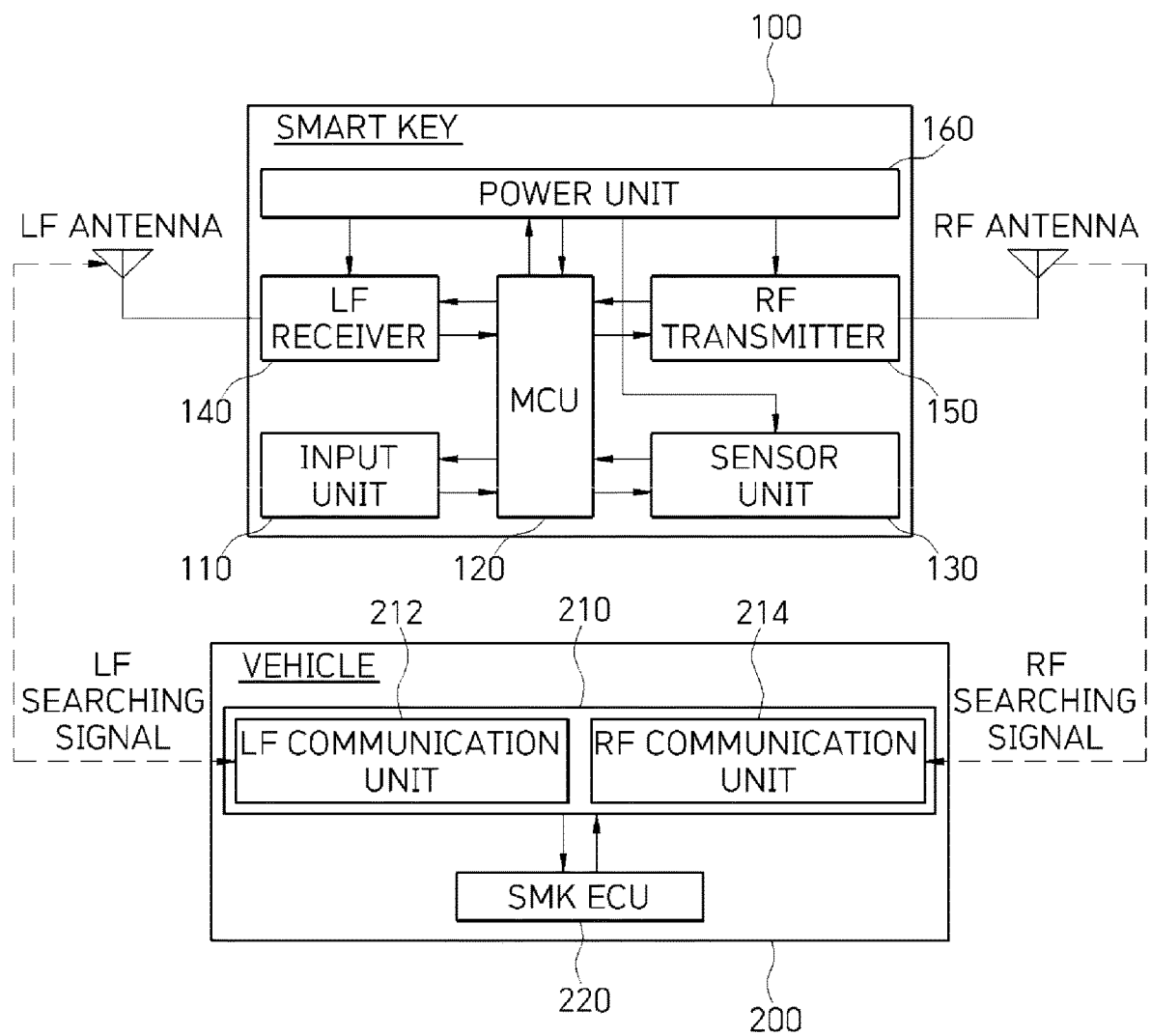
FIG. 1 is a block diagram illustrating a smart key according to an embodiment of the present invention.

Hereinafter, example embodiments of the present invention will be described in detail with reference to the accompanying drawings. Embodiments of the present invention are provided so that this disclosure will be thorough and complete, and will fully convey the concept of the present invention to one of ordinary skill in the art. Because the present invention may have diverse modified embodiments, exemplary embodiments are illustrated in the drawings and are described in the detailed description of the present invention. However, this does not limit the present invention within specific embodiments and it should be understood that the present invention covers all the modifications, equivalents, and replacements within the idea and technical scope of the present invention. Like reference numerals refer to like elements throughout.

FIG. 1 is a block diagram of a smart key 100 according to an embodiment of the present invention.

Referring to FIG. 1, the smart key 100 according to an embodiment of the present invention may include an input unit 110 which receives a control command corresponding to a vehicle 200, a micro control unit (MCU) 120 configured to control elements of the smart key 100, a sensor unit 130 configured to sense a motion of the smart key 100, an LF receiver 140 and an RF transmitter 150 configured to communicate with the vehicle 200, and a power unit 160 configured to supply power to the elements 120, 130, 140, and 150 of the smart key 100.

The elements of the smart key 100 illustrated in FIG. 1 are merely an embodiment, and the present embodiments are not limited thereto. For example, although not illustrated in FIG. 1, the smart key 100 may further include a display part, which includes a touch function and provides various items of information to a user, and an output part configured to output a sound.

The input unit 110 may act as an interface between the user and the smart key 100 or between the user and the vehicle 200.

The input unit 110 may be implemented with a hard key installed at an outer portion of the smart key 100, a dial, and a display having a touch function. The user may provide, through the input unit 110, various control commands corresponding to the vehicle 200.

A control command input through the input unit 110 may be input to the MCU 120.

The control command may be a command configured to activate a remote keyless entry (RKE) function, a passive keyless entry (PKE) function, a welcome light function, opening or closing a trunk, starting the vehicle, or outputting a warning sound.

The sensor unit 130 may sense a motion of the smart key 100 from an impetus of a control command of the MCU 120. The sensor unit 130 may convert a result of sensing an aspect of the motion (for example, sensing a strength of the motion) into an electrical signal, and input the electrical signal to the MCU 120.

Although not illustrated, the sensor unit 130 may include at least one of a vibration sensor (not illustrated) configured to sense a vibration of the smart key 100, an acceleration sensor (not illustrated) configured to sense an acceleration variation of the smart key 100, and a gyro sensor (not illustrated) configured to sense a position change of the smart key 100.

The sensor unit 130 may sense at least one of a vibration of the smart key 100, shaking of the smart key 100, and a position change of the smart key 100, which are caused by a motion of the user possessing the smart key 100.

Moreover, the sensor unit 130 may adaptively adjust a sensing strength (sensing sensitivity) thereof under a specific situation (or a specific condition) on the basis of a control command from the MCU 120.

The sensing strength (sensing sensitivity) of the sensor unit 130 may be adaptively adjusted, and thus, may minimize a dark current of the sensor unit 130 in order to improve battery efficiency (battery consumption).

An adjustment of the sensing strength (sensing sensitivity) of the sensor unit 130 may decrease or increase a sensing period (a clock period) of the sensor unit 130.

A specific situation (or a specific condition), where the turn-on/off operation and sensing strength (sensing sensitivity) of the sensor unit 130 are adjusted is described herein.

The LF receiver 140 may receive, through an LF antenna, an LF signal from a vehicle communication unit 210 of the vehicle 200. The LF signal may be a wireless signal having a low frequency band of 120 kHz to 135 kHz.

The LF receiver 140 may include a memory configured to store data, a program configured to perform modulation/demodulation, and a processor configured to perform modulation/demodulation on the LF signal using data and programs stored in the memory.

The LF receiver 140 may receive an LF searching signal which is periodically transmitted by the vehicle 200. The LF searching signal may denote an LF signal which is transmitted by the vehicle 200 to a periphery (within an LF communication-enabled range) of the vehicle 200, to determine whether the smart key 100 is within an LF communication-enabled range (or an LF reception distance) from the vehicle 200.

Moreover, the LF receiver 140 may perform a turn-on/off operation under a situation (or a condition) by control of the MCU 120. Situations (or specific conditions) where the LF receiver 140 is turned on or off are described herein.

The RF transmitter 150 may transmit an RF signal to the vehicle communication unit 210 of the vehicle 200. Here, the RF signal may be a wireless signal having an ultra-high frequency (UHF) of 315 MHz to 433 MHz. The RF transmitter 150 may be referred to as a radio frequency integrated circuit (RFIC).

The RF transmitter 150 may include a memory configured to store data and a program configured to perform modulation/demodulation and a processor configured to perform modulation/demodulation on the RF signal using data and programs each stored in the memory.

The RF transmitter 150 may include a communication port to connect an RF communication network to the MCU 120 of the smart key 100 and a transmitter configured to transmit the RF signal.

The RF transmitter 150 may transmit a searching response signal, responding to a searching signal of the vehicle 200, to the vehicle 200. The searching response signal may denote an RF signal configured to notify the vehicle 200 that the smart key 100 has received the searching signal from the vehicle 200.

The RF transmitter 150 may perform a turn-on/off operation under a specific situation (or a specific condition) on the basis of instructions transmitted from the control of the MCU 120. Specific situations (or specific conditions), where the turn-on/off operation of the RF transmitter 150 is controlled, is described herein.

The power unit 160 may supply power to the elements of the smart key 100 and may include a battery (for example, a lithium ion battery).

The power unit 160 may supply power to the LF receiver 140 and/or the RF transmitter 150 or may cut off the supply of the power, based on a control command of the MCU 120. For example, when the MCU 120 receives data or information representing the motion or not of the smart key 100 from sensor unit 130, the MCU 120 may transfer, to the power unit 160, the control command configured to supply power to the LF receiver 140 and/or the RF transmitter 150 or to cut off the supply of power.

The MCU 120 may include a memory and a processor configured to control operations of the elements 110, 120, 130, 140, 150, and 160 of the smart key 100.

The MCU 120 may generate a control command (a control signal) configured to generate locking or unlocking (RKE function and PKE function) of doors of the vehicle 200, opening or closing of a trunk, or outputting of a warning sound on the basis of a control command from the input unit 110. The MCU may control transmission of the generated control command to the vehicle 200.

The MCU 120 may control the turn-on/off operation of the sensor unit 130, the sensing strength (sensing sensitivity, for example, a sensing period, a period of a sensing frequency, a frequency of a sensing clock, or the like) of the sensor unit 130, the turn-on/off operation of the LF receiver 140, and the turn-on/off operation of the RF transmitter 150 under a situation (or a condition).

The power unit 160 may supply the power to the elements or may cut off the supply of the power, in response to a control command (a control signal) of the MCU 120 corresponding to a specific situation (or a specific condition). For example, supply of the power from the power unit 160 to the sensor unit 130, the LF receiver 140, and the RF transmitter 150 may denote the turn-on of the elements 130 to 150, and cutoff of the power may denote the turn-off of the elements 130 to 150.

A turn-on/off operation of each of the elements 130 to 150 may be performed based on a mode change of each element, in addition to the supply and cutoff of the power. For example, an operation of changing, by the MCU 120, a processor of each of the sensor unit 130, the LF receiver 140, and the RF transmitter 150 from a sleep mode to a wakeup mode may be an operation of turning on the sensor unit 130, the LF receiver 140, and the RF transmitter 150. Operations may include changing, by the MCU 120, the processor of each of the sensor unit 130, the LF receiver 140, and the RF transmitter 150 from the wakeup mode to the sleep mode, which may be an operation of turning off the sensor unit 130, the LF receiver 140, and the RF transmitter 150.

In order to change a mode of each of the sensor unit 130, the LF receiver 140, and the RF transmitter 150, the MCU 120 may transfer a control command (a control signal), corresponding to a situation (or a specific), to the processor of each of the sensor unit 130, the LF receiver 140, and the RF transmitter 150.

Specific situations (or specific conditions) configured to determine a turn-on/off operation of each of the sensor unit 130, the LF receiver 140, and the RF transmitter 150 are described herein.

As illustrated in FIG. 1, the vehicle 200 may include the vehicle communication unit 210 which is configured to communicate with the smart key 100 and a vehicle controller (hereinafter referred to as a smart key electrical control unit (SMK ECU)) 220 configured to control electronic parts or elements of the vehicle 200.

The vehicle communication unit 210 may include an LF communication unit 212 configured to transmit and receive an LF signal to and from the smart key 100 and an RF communication unit 214 for configured to transmit and receive an RF signal to and from the smart key 100.

The LF communication unit 212 of the vehicle 200 may transmit the LF signal to the smart key 100 over an LF communication network. Also, the LF communication unit 212 of the vehicle 200 may transmit a searching signal to the smart key 100 on the basis of a transmission period of the searching signal. Here, the searching signal may denote an LF signal which is transmitted by the LF communication unit 212 of the vehicle 200 to a periphery (within an LF communication-enabled distance) of the vehicle 200, to determine whether the smart key 100 is within an LF communication-enabled range from the vehicle 200.

The RF communication unit 214 of the vehicle 200 may receive the RF signal from the smart key 100 over the RF communication network. Also, the RF communication unit 214 of the vehicle 200 may receive a searching response signal from the smart key 100. Here, the searching response signal may denote a signal configured to notify the smart key 100 that the vehicle 200 has received the searching response signal from the smart key 100.

Moreover, the RF communication unit 214 of the vehicle 200 may include an RF signal conversion module which is configured to demodulate the RF signal received through the RF communication unit 214 on the basis of the control of the vehicle controller 220.

As described herein the LF signal may denote a signal which is transmitted from the vehicle 200 to the smart key 100 over the LF communication network, and the RF signal may denote a signal which is transmitted from the smart key 100 to the vehicle 200 over the RF communication network.

In a case where the LF communication unit 212 of the vehicle 200 transmits the LF searching signal to the smart key 100 and the RF communication unit 214 of the vehicle 200 receives the RF searching response signal from the smart key 100, the vehicle 200 and the smart key 100 may perform a series of authentication processes.

When authentication is completed, the SMK ECU 220 may unlock locks of elements of the vehicle 200 so as to enable an authenticated user to use various electronic parts of the vehicle 200. For example, when authentication is completed, the SMK ECU 220 may unlock the lock of a steering wheel, the lock of a start button, the lock of a trunk of the vehicle 200, and the door lock of a vehicle handle, among others. An authentication method between the vehicle 200 and the smart key 100 may be technology known to those skilled in the art, and thus, its detailed description is omitted.

The SMK ECU 220 may include a steering lock controller which is configured to control a lock/unlocking of the steering wheel, a start button controller which is configured to turn on or off the start of the vehicle 200, and a trunk controller which is configured to control the lock/unlocking of the trunk of the vehicle 200.

Additionally, the SMK ECU 220 may further include various control modules which are configured to control the lock or unlocking of electronic parts of the vehicle 200 on the basis of the authentication or non-authentication of the SMK ECU 220 and the smart key 100.

The SMK ECU 220 may include a memory which stores data, a program configured to control the electronic parts of the vehicle, and a processor configured to generate a control signal on the basis of the data and the programs each stored in the memory.

The SMK ECU 220 may control an operation of the vehicle 200 using signals received from the smart key 100 through the vehicle communication unit 210.

Exemplary embodiments include situations and conditions configured to control the turn-on/off operation of each of the sensor unit 130, the LF receiver 140, and the RF transmitter 150 will be described. Turn-on and turn-off of elements of the smart key 100 may have beneficial results, such as improving battery life and efficiency.

When the sensor unit 130 senses a motion (vibration sensing, shaking sensing, and position change sensing) for X seconds or more, the LF receiver 140 may be turned off based on conditions of algorithms illustrated and described herein.

When the smart key 100 is disposed at an LF reception distance (a range enabling LF communication with the vehicle 200), the RF transmitter 150 may be turned on. When the smart key 100 is disposed outside the LF reception distance (a range enabling LF communication with the vehicle 200), the RF transmitter 150 may be turned off. In addition, the RF transmitter 150 may be turned on based on conditions of algorithms illustrated and described herein.

In a state where the sensor unit 130 is turned on, the sensing strength (for example, sensing sensitivity, a sensing period, and a sensing frequency) of the sensor unit 130 may be adjusted to increase an efficiency of a current.

As the sensing strength (for example, sensing sensitivity, a sensing period, and a sensing frequency) of the sensor unit 130 increases, the sensor unit 130 may sense a motion of the smart key 100. In proportion to an amount of the motion, the amount of current (or a dark current) consumption may increase.

Therefore, in an embodiment of the present invention, the MCU 120 may adjust the sensing sensitivity of the sensor unit 130 under a specific situation (or a specific condition) to improve current consumption (a dark current).

Specific situations or conditions to control the turn-on/off operation of each of the sensor unit 130, the LF receiver 140, and the RF transmitter 150 may be classified into at least six situations (or six conditions). These situations are illustrated in FIGS. 2 to 4, and may be based on a position of the smart key 120.

Figure 2A:
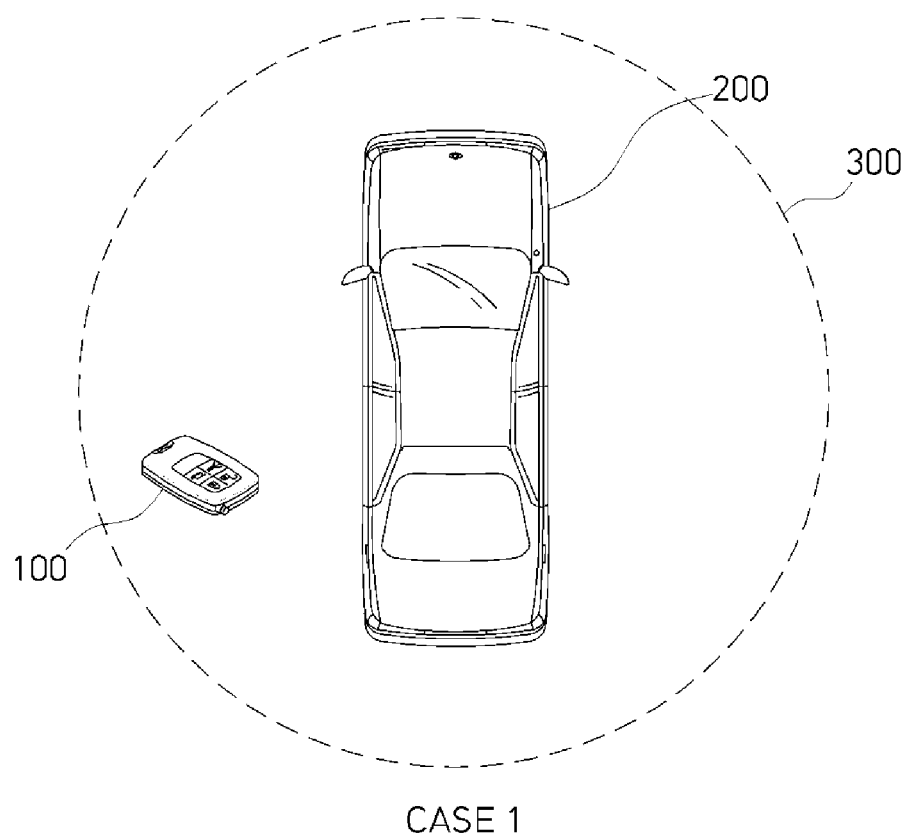
FIG. 2A, FIG. 2B, FIG. 3A, FIG. 3B, FIG. 4A and FIG. 4B are diagrams illustrating a specific situation (or a specific condition) for controlling a turn-on/off operation of a sensor unit, an LF receiver, and an RF transmitter according to an embodiment of the present invention.
Figure 2B:
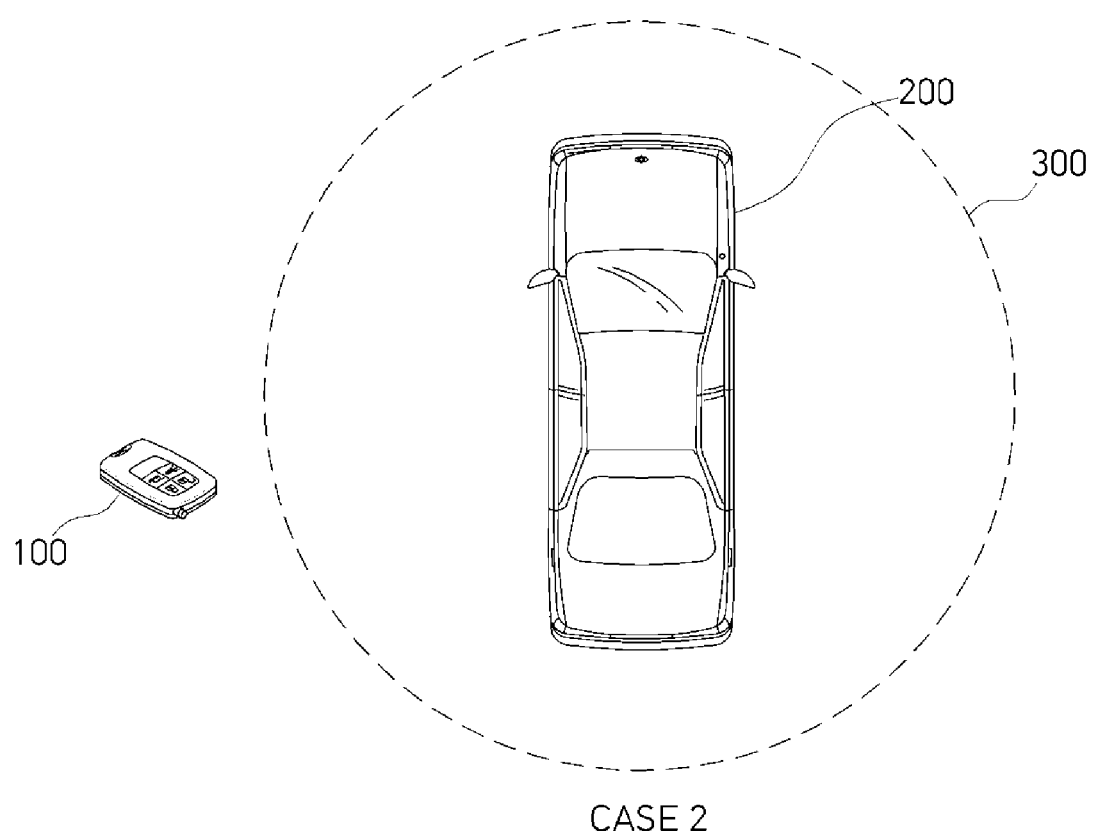

FIG. 2A illustrates a case where the smart key 100 is disposed at the LF reception distance 300 (a range enabling LF communication with the vehicle 200). FIG. 2B illustrates a case where the smart key 100 is disposed outside the LF reception distance 300.

Figure 3A:
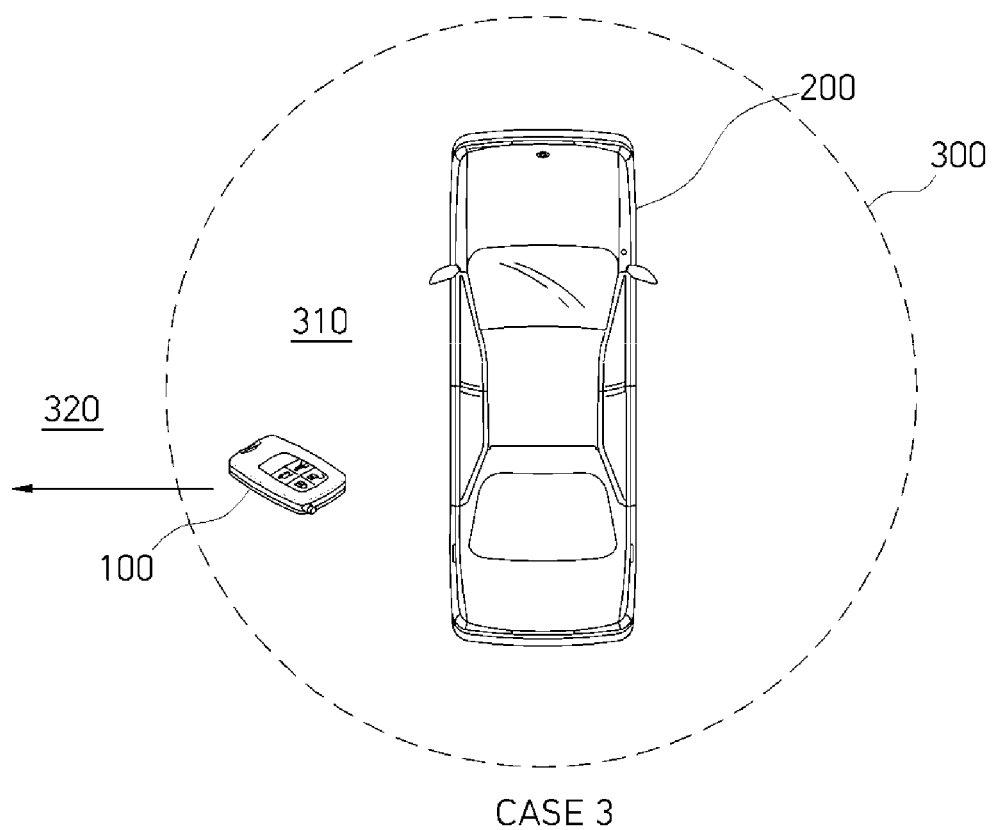
Figure 3B:
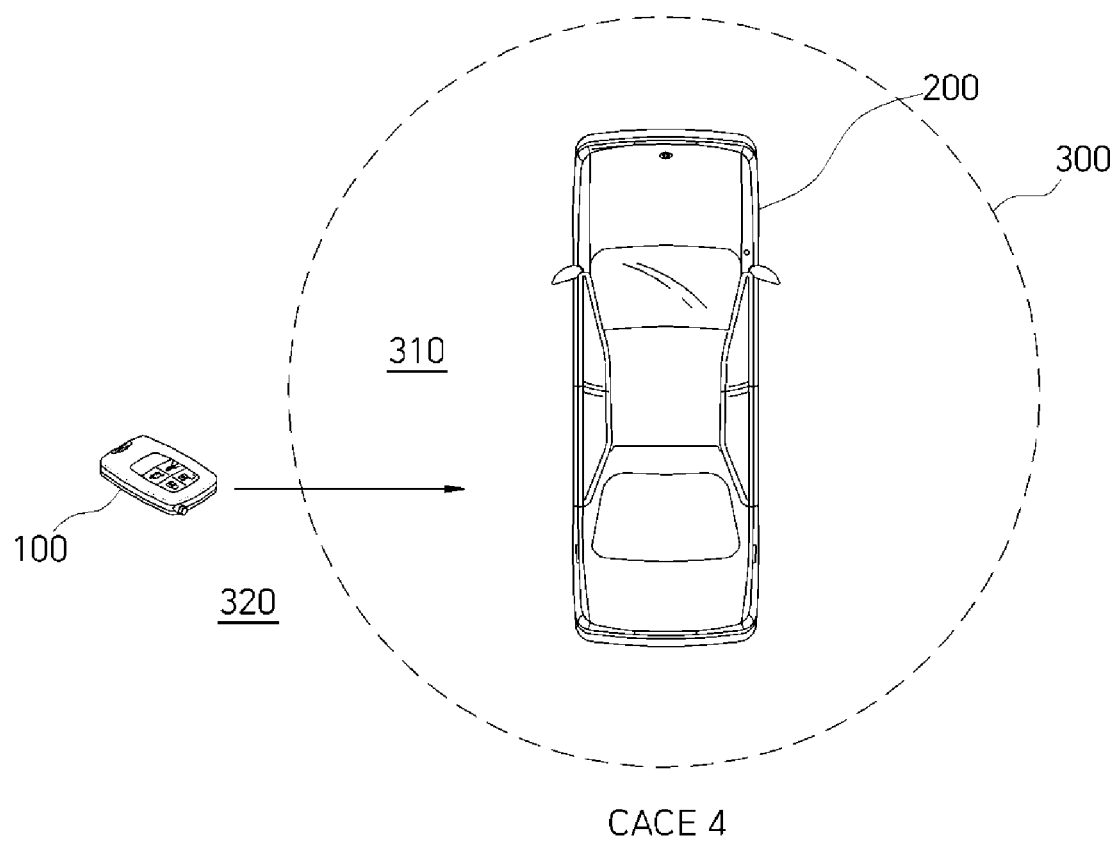

FIG. 3A illustrates a case where the smart key 100 moves from a position 310 inside the LF reception distance 300 to a position 320 outside the LF reception distance, based on a movement of a user (or a driver). FIG. 3B illustrates a case where the smart key 100 moves from the position 320 outside of the LF reception distance 300 to the position 310 inside the LF reception distance 300

Figure 4A:
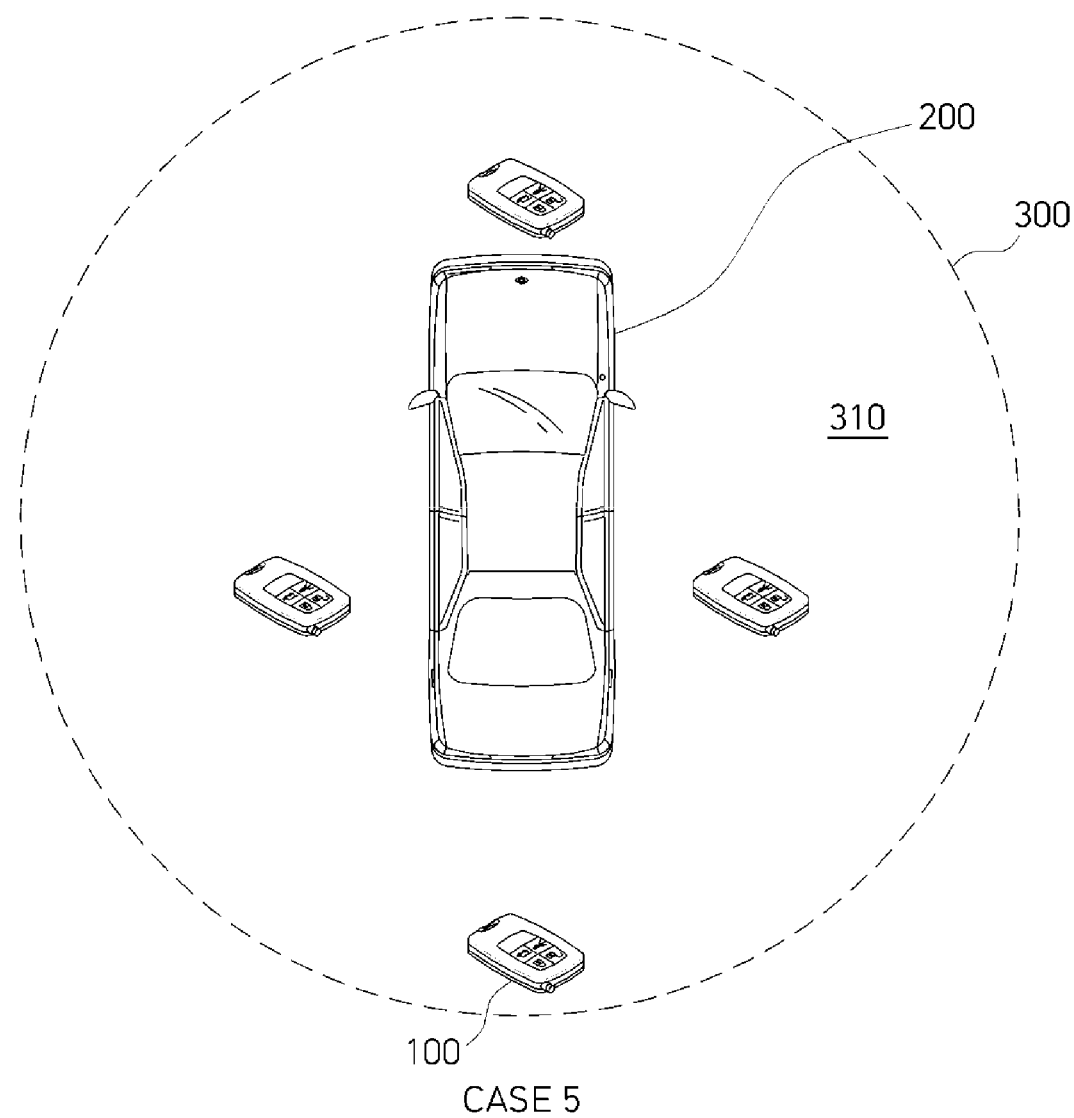
Figure 4B:
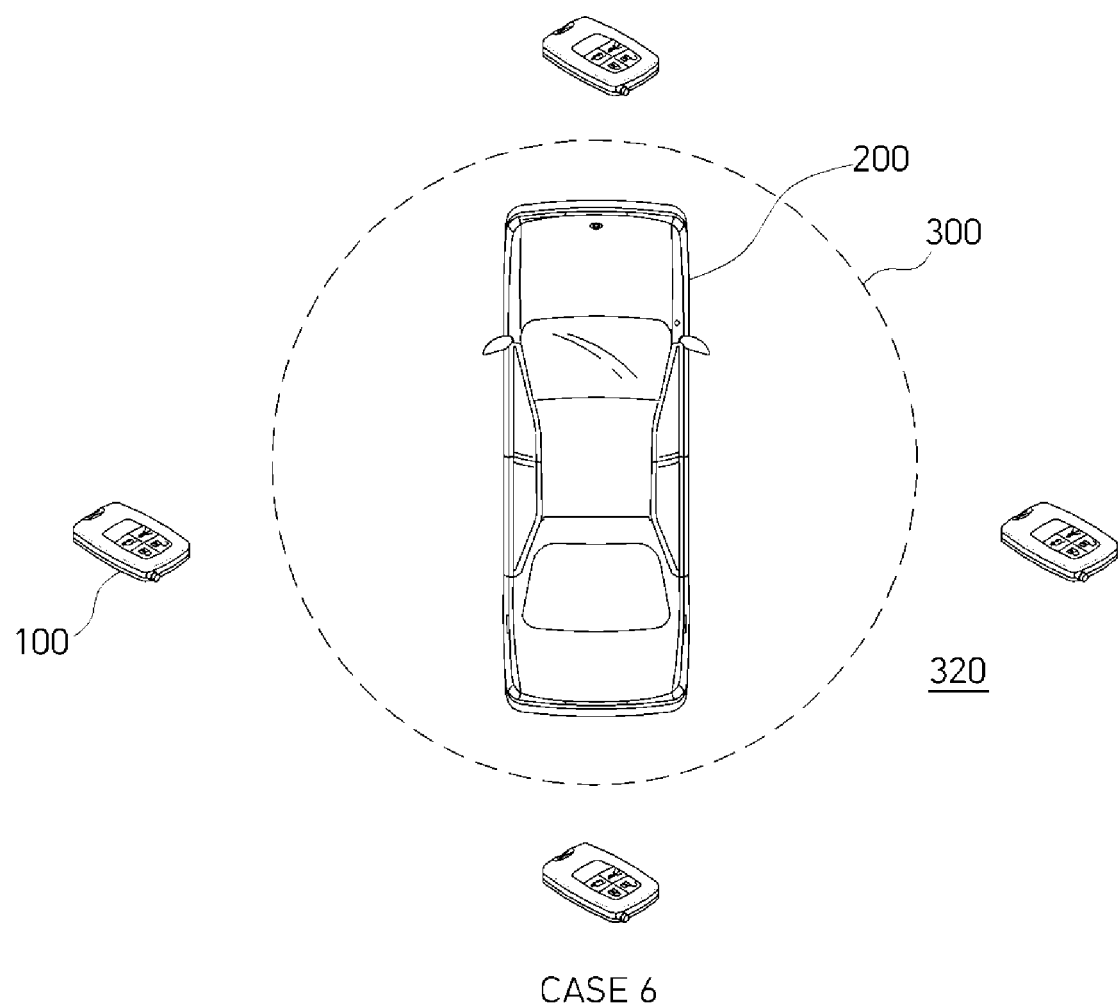

FIG. 4A illustrates a case (a case where the smart key 100 stays near the vehicle 200) where the smart key 100 stays within the LF reception distance 300 for a predetermined time (for example, several seconds). FIG. 4B illustrates a case (a case where the smart key 100 stays at a position apart from the vehicle 200) where the smart key 100 stays outside the LF reception distance 300 for a predetermined time (for example, several seconds).

For convenience, FIGS. 2A, 2B, 3A, 3B, 4A, and 4B may be referred to as Cases 1 to 6 respectively.

Thus, Case 1 is a case where a position of a smart key is within an LF reception distance, as illustrated in FIG. 2A.

In Case 1, the sensor unit 130 may be turned off by a control command of the MCU 120, and the LF receiver 140 and the RF transmitter 150 may be turned on by the control command of the MCU 120. Case 1 may enable a PKE function or a vehicle start function. The following Table 1 illustrates operating states of the sensor unit 130, the LF receiver 140, and the RF transmitter 150 in Case 1.

TABLE 1

| Case 1 | Sensor unit | LF receiver | RF transmitter |
| --- | --- | --- | --- |
| Operating state | OFF | Normal ON | Normal ON |

Case 2 (a case where a position of a smart key is outside an LF reception distance, FIG. 1B)

In Case 2, the sensing strength (sensing sensitivity) of the sensor unit 130 may be adjusted based on a control command of the MCU 120, and the LF receiver 140 may be turned on by the control command of the MCU 120, for determination (determining that the smart key moves from the outside of the LF reception distance to the inside of the LF reception distance) of the following Case 4. In this case, in order to decrease battery consumption, the LF receiver 140 may be turned on only when the sensor unit 130 with adjusted sensing strength (sensing sensitivity) senses a motion of the smart key. One adjustment of the sensor unit 130 may be to increase the sensing strength.

Moreover, the RF transmitter 150 may be turned off by a control command of the MCU 120, and thus, RF transmission (automatic response) to LF reception may be blocked. In this case, the RF transmitter 150 may be turned on only when the MCU 120 recognizes the occurrence of a smart key button input through the input unit 110.

The following Table 2 may illustrate operating states of the sensor unit 130, the LF receiver 140, and the RF transmitter 150 of Case 2.

TABLE 2

| Case 2 | Sensor unit | LF receiver | RF transmitter |
| --- | --- | --- | --- |
| Operating state | ON (adjustment of sensing sensitivity) | ON (optional ON) only when a motion of a smart key is sensed by a sensor unit | OFF ON only when a button input occurs |

Case 3 (a case distancing from a vehicle, FIG. 3A)

Case 3 may be a case where the smart key 100 moves from the position 310 inside of the LF reception distance 300 to the position 320 outside of the LF reception distance 300, based on a movement of a user. In this case, the sensor unit 130 may be turned on based on the control of the MCU 120, and the RF transmitter 150 may be turned on based off the control of the MCU 120. Also, as illustrated in Table 2, the RF transmitter 150 may turn off (OFF) RF transmission (automatic response) to LF reception, and only when a button input occurs, the RF transmitter 150 may operate as OFF, outside the LF reception distance.

Moreover, even when the smart key moves from the inside of the LF reception distance 300 to the outside of the LF reception distance, the LF receiver 140 may continuously be maintained ON. However, outside the LF reception distance 300, the LF receiver 140 may be turned on only when the sensor unit 130 changed to ON and senses a motion of the smart key 100. When there is no motion of the smart key 100, the LF receiver 140 may be turned off.

That is, when the smart key 100 moves from the inside of the LF reception distance 300 to the outside of the LF reception distance 300, the LF receiver 140 may be changed from a normal ON state to an optional ON state.

The following Table 3 illustrates operating states of the sensor unit 130, the LF receiver 140, and the RF transmitter 150 in Case 3.

TABLE 3

| Case 3 | Sensor unit | LF receiver | RF transmitter |
|---|---|---|---|
| Operating state | Change from OFF to ON | Change from normal ON to optional ON | OFF ON only when a button input occurs |

Case 4 (a case approaching a vehicle, FIG. 3B)

Case 4 may be a case where the smart key 100 moves from the position 320 outside of the LF reception distance 300 to the position 310 inside of the LF reception distance 300. In this case, the sensor unit 130 may be changed from ON to OFF on the basis of the control of the MCU 120, and the LF receiver 140 may maintain an ON state on the basis of the control of the MCU 120. The LF receiver 140 may operate in a normal ON state (the LF receiver 140 should be normally turned on because the sensor unit is turned off) changed from an optional ON state (a state which is turned on (ON) only when there is a motion of the smart key). Also, the RF transmitter 150 may be changed from an OFF state (where an OFF state denotes an optional OFF state because the RF transmitter 150 is turned on (ON) when a button input occurs) to a normal ON state on the basis of the control command of the MCU 120. As illustrated, the positions 310 and 320 are intended to denote arbitrary positions within or outside of the LF reception distance 300, and are not limited to a specific location.

As described above, in Case 4, since the LF receiver and the RF transmitter are in a normal ON state, the PKE function or the vehicle start function may be activated.

The following Table 4 may illustrate operating states of the sensor unit 130, the LF receiver 140, and the RF transmitter 150 in Case 4.

TABLE 3

| Case 4 | Sensor unit | LF receiver | RF transmitter |
|---|---|---|---|
| Operating state | Change from ON to OFF | Change from optional ON to normal ON | Change from optional OFF to normal ON |

Case 5 (a case staying near a vehicle, FIG. 4A)

Case 5 may be a case where the smart key 100 stays at the LF reception distance for a predetermined time (Y seconds or more), and in this case, the PKE function or the vehicle start function may be activated. It may be considered that Case 5 is substantially the same as Case 1.

Case 6 (a case staying outside a vehicle, FIG. 4B).

Case 6 may be a case where the smart key 100 stays outside the LF reception distance for a predetermined time (Y seconds or more), the LF receiver and the RF transmitter may be turned off, and thus, a vibration sensing mode may be activated. In Case 6, the sensor unit may be turned on, and the LF receiver and the RF transmitter may be turned off. In this case, because the LF receiver is turned off, hacking such as an RSA may be prevented.

In Cases 1 to 6, whether the smart key is at or outside the LF reception distance (an LF communication-enabled range) may be determined based on a received signal strength indicator (RSSI) of an LF signal.

For example, the MCU 120 may compare reference strength with an RSSI of the LF signal received through the LF receiver 140, and when the RSSI of the received LF signal is equal to or greater than the reference strength, the MCU 120 may determine that the smart key 100 is located at the LF reception distance (an LF communication-enabled range). When the RSSI of the received LF signal is less than the reference strength, the MCU 120 may determine that the smart key 100 is located outside the LF reception distance (an LF communication-enabled range).

Because only the PKE function and/or the vehicle start function is needed at the LF reception distance, the sensor unit 130 may be turned off based on the control of the MCU 120. Accordingly, a dark current caused by the sensor unit 130 may be minimized.

Because only an RF output function (an RF transmission function) is used outside the LF reception distance, the RF transmitter 150 may maintain an OFF state, and then, only when button push is recognized through the input unit 110 of the smart key 100, the RF transmitter 150 may be turned on (ON). Accordingly, a dark current caused by the RF transmitter 150 (RFIC) may be cut off.

Moreover, because there is a case where the smart key 100 enters the LF reception distance, the LF receiver 140 may maintain an ON state outside the LF reception distance to check entering of the LF reception distance, and only when a motion of the smart key is sensed by the sensor unit 130, the LF receiver 140 may maintain an ON state, thereby minimizing battery consumption.

When the smart key 100 stays within the LF reception distance 300 for several seconds or more, the user may select the PKE function or the vehicle start function, and thus, the LF receiver 140 and the RF transmitter 150 may be turned on (ON).

The smart key 100 may be divided into two cases outside the LF reception distance.

A first case may be a case (a stationary state) where the smart key 100 stays outside the LF reception distance 300 for several seconds or more. When it is determined by the MCU 120 that the user does not use the smart key 100 (for example, an action of placing the smart key 100 on a shelf), the MCU 120 may turn off the LF receiver 140 and the RF transmitter 150, and then, a motion sensing mode of the sensor unit 130 may be maintained. In this case, when a motion is stopped outside the vehicle, the LF receiver 140 and the RF transmitter 150 may be turned off (OFF), and thus, an RSA may be prevented.

A second case may be a case where the user (the driver) possesses and moves with the smart key 100, outside of the LF reception distance 300.

In such a case (a case which does not use the vehicle for a long time) where the smart key moves outside the LF reception distance, the sensor unit 130 may be turned off (OFF) to improve battery efficiency. However, in a case where the smart key 100 stays outside the LF reception distance 300 for a short time period as in the first case, because functions (the LF reception function and the RF transmission function) of the smart key are deactivated, it is difficult to completely turn off the sensor unit 130, to again activate the functions.

In the sensor unit 130, a current flowing based on sensing strength (sensing sensitivity) may differ, and when a motion of the smart key 100 is small (a stationary state), the sensing strength (sensing sensitivity) may increase. When a motion of the smart key 100 is large, the sensing strength (sensing sensitivity) may decrease.

That is, when a motion of the smart key 100 is small (a stationary state), the sensing strength (sensing sensitivity) of the sensor unit 130 may be adjusted to a first sensitivity level based on a control command of the MCU 120. When motion of the smart key 100 is large, the sensing strength (sensing sensitivity) may be adjusted to a second sensitivity which is less than the first sensitivity.

The amount of motion may be determined based on a predetermined reference value. For example, the MCU 120 may analyze a motion value of the smart key 100 sensed by the sensor unit 130. When the amount of motion is equal to or greater than the predetermined reference value, the MCU 120 may determine that the motion is large. When the amount of motion is less than the predetermined reference value, the MCU 120 may determine that the motion is small.

When the motion of the smart key 100 is large outside the LF reception distance 300, a measurement value sufficient to sense a motion (for example, a vibration) may be secured despite a reduction in sensing strength (sensing sensitivity).

On the other hand, when the smart key 100 stops outside the LF reception distance 300, by increasing the sensing strength (sensing sensitivity), the user (the driver) may accurately check an intention of using the smart key 100.

In this case, in order to prevent the LF receiver 140 from being turned on by a motion (for example, a vibration) when the smart key 100 stops, the turn-on (ON) of the LF receiver 130 may be determined based on a motion determining condition (is a motion signal is received Z times for X seconds).

Such a motion determining condition may be applied even when the sensing strength (sensing sensitivity) is small, and because a motion is large when the sensing strength (sensing sensitivity) is small, the motion determining condition may be sufficiently satisfied.

Figure 5:
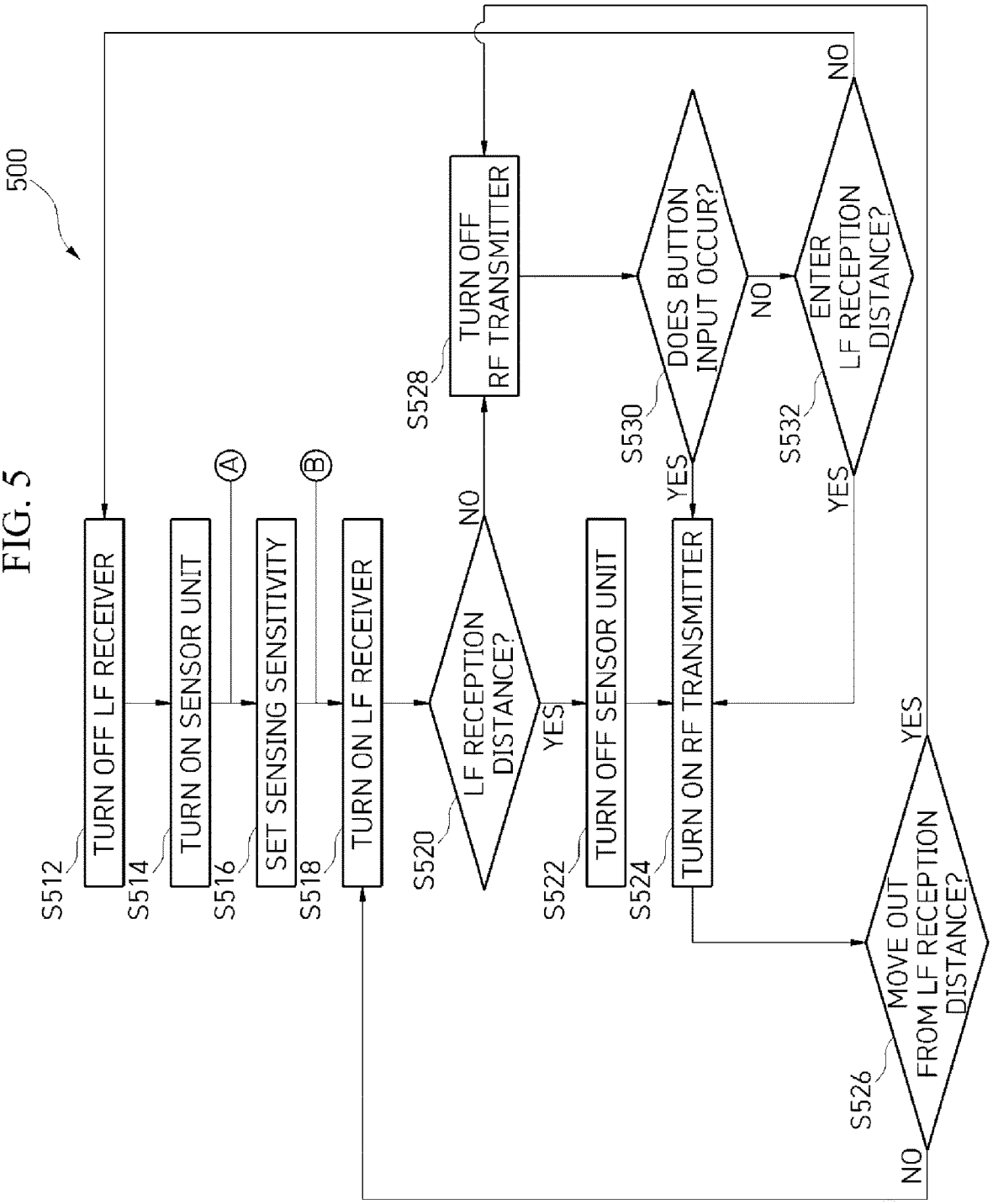
FIG. 5 is a flowchart illustrating a method of controlling a smart key according to an embodiment of the present invention.
Figure 6:
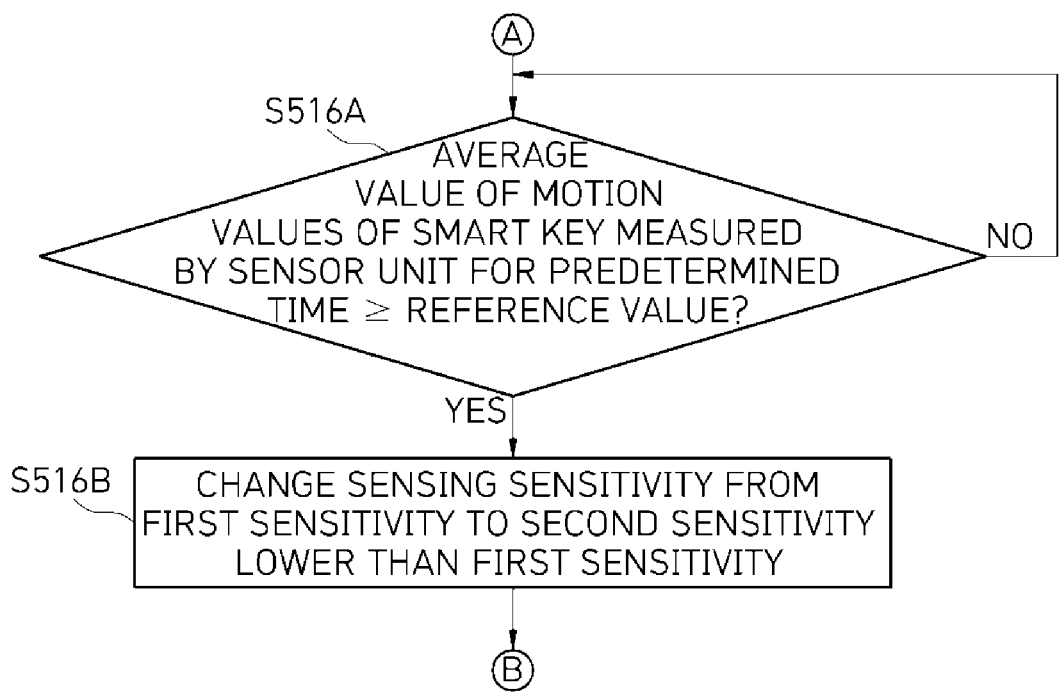
FIG. 6 is a detailed flowchart of step S516 illustrated in FIG. 5.

FIG. 5 is a flowchart illustrating a method 500 of controlling a smart key according to an exemplary embodiments described herein. FIG. 6 is a detailed flowchart of step S516 illustrated in FIG. 5.

Referring to FIG. 5, first, the method 500 of controlling the smart key may start at an OFF state of the LF receiver 140 in step S512.

Subsequently, in step S514, in the OFF state of the LF receiver 140, the sensor unit 130 may be changed from an OFF state to an ON state on the basis of a control command of the MCU 120.

Subsequently, in step S516, the sensing strength (sensing sensitivity) of the sensor unit 130 may be set based on the control command of the MCU 120. By changing the sensing strength (sensing sensitivity) of the sensor unit 130, a dark current caused by the sensor unit 130 may be minimized, thereby improving the battery efficiency of the power unit 160.

Changing of the sensing strength (sensing sensitivity) of the sensor unit 130 may be performed based on a sensing period, a clock associated with the sensing period, and adjustment of a frequency of the sensing period according to the control command of the MCU 120. For example, the sensor unit 130 may include a clock generator which generates a plurality of clocks having different frequencies and a multiplexer which selects the plurality of clocks generated by the clock generator. The multiplexer may select a clock configured to change a sensing period (a sensing frequency) by using the control command of the MCU 120 as a selection signal.

A detailed process of changing the sensing strength (sensing sensitivity) of the sensor unit 130 is illustrated in FIG. 6. Referring to FIG. 6, in step S516A, the MCU 120 may determine whether an average value of motion values (or measurement values) obtained by measuring a motion of the smart key 100 by the sensor unit 130 for a predetermined time is a reference value.

Subsequently, in step S516B, when the average value of the motion value (or the measurement value) is equal to or greater than the reference value, the MCU 120 may lower a first sensing sensitivity, defaulted by the sensor unit 130, to a second sensing sensitivity lower than the first sensing sensitivity to minimize a dark current caused by the sensor unit 130. For example, when the average value of the motion value (or the measurement value) is less than the reference value, the MCU 120 may maintain the first sensing sensitivity defaulted by the sensor unit 130.

Referring again to FIG. 5, in step S518, when a setting of the sensing strength (sensing sensitivity) of the sensor unit 130 is completed, the LF receiver 140 may be changed from an OFF state to an ON state on the basis of the control command of the MCU 120. As the LF receiver 140 is turned on (ON), the smart key 100 may be put in a state enabling LF communication with the vehicle.

Subsequently, in step S520, the MCU 120 may compare an RSSI of an LF signal, received by the LF receiver 140, with reference strength to determine whether the smart key 100 is at the LF reception distance (an LF communication-enabled range).

The reference strength may be previously set to determine whether the smart key 100 is at the LF reception distance 300. For example, when the RSSI of the LF signal is equal to or greater than the reference strength, the MCU 120 may determine that the smart key 100 is at the LF reception distance 300, and when the RSSI of the LF signal is less than the reference strength, the MCU 120 may determine that the smart key 100 is outside the LF reception distance 300.

Subsequently, in step S522, when it is determined that the smart key 100 is at the LF reception distance 300, the sensor unit 130 may be turned off based on the control command of the MCU 120, and in step S524, the RF transmitter 150 may be turned on based on the control command of the MCU 120. As the sensor unit 130 is turned off at or near the LF reception distance 300, battery consumption caused by the sensor unit 130 may be reduced.

Subsequently, in step S526, the MCU 120 may compare the RSSI of the LF signal, received by the LF receiver 140, with the reference strength to determine whether the smart key 100 deviates from the LF reception distance 300.

When it is determined that the smart key 100 does not deviate from the LF reception distance 300, the MCU 120 may return to step S518 and may again perform steps subsequent to step S518.

When it is determined that the smart key 100 deviates from the LF reception distance 300, the MCU 120 may move to step S528, and in step S528, the RF transmitter 150 may be turned off in response to the control command of the MCU 120.

In step S520 described above, when it is determined by the MCU 120 that the smart key 100 is outside the LF reception distance 300, the MCU 120 may move to step S528.

In step S528, the RF transmitter 150 may be turned off based on the control command of the MCU 120.

Subsequently, in step S530, the MCU 120 may determine whether a button input of the user (the driver) occurs through the input unit 110.

When the button input occurs, the MCU 120 may move from step S530 to step S524, and the RF transmitter 150 may be turned on in response to the control command of the MCU 120. In a case where the smart key 100 is outside the LF reception distance 300, only when the button input of the user (the driver) occurs, the RF transmitter 150 may be turned on, thereby decreasing battery consumption caused by the RF transmitter 150.

Subsequently, in step S532, the MCU 120 may compare the RSSI of the LF signal with the reference strength to determine whether the smart key 100 enters the LF reception distance 300.

When it is determined by the MCU 120 that the smart key 100 enters the LF reception distance 300, the MCU 120 may move to step S524, and the RF transmitter 150 may be changed from an OFF state to an ON state.

For example, when it is determined that the smart key 100 does not enter the LF reception distance 300 for a predetermined time and stays outside the LF reception distance 300, the MCU 120 may return to step S512, the LF receiver 140 may be turned off based on the control command of the MCU 120, and the sensor unit 130 may be again turned on based on the control command of the MCU 120 in step S514. Subsequently, steps S516 to S532 may be repeatedly performed.

As described above, according to an embodiment of the present invention, when the smart key 100 is at the LF reception distance 300, a sensor unit (for example, a vibration sensor) may be turned off, thereby minimizing a dark current.

Moreover, according to an embodiment of the present invention, when the smart key 100 is outside the LF reception distance 300, a dark current may be minimized by adaptively controlling sensing strength (sensing sensitivity) of the sensor unit (for example, the vibration sensor).

That is, when a motion of the smart key 100 is large, it may not be required to increase the sensing strength (sensing sensitivity) and thus the sensing strength (sensing sensitivity) may be reduced (for example, a sensing frequency of 1.6 Hz), and when the motion of the smart key 100 is small (a stationary state), the sensing strength (sensing sensitivity) may increase (for example, a sensing frequency of 12.5 Hz), thereby adaptively adjusting the sensing strength (sensing sensitivity) on the basis of the amount of motion of a smart key to minimize a dark current.

Additionally, according to an embodiment of the present invention, because an LF receiver and/or an RF transmitter are turned off based on a situation (condition), and thus, an RSA may be prevented.

Figure 7:
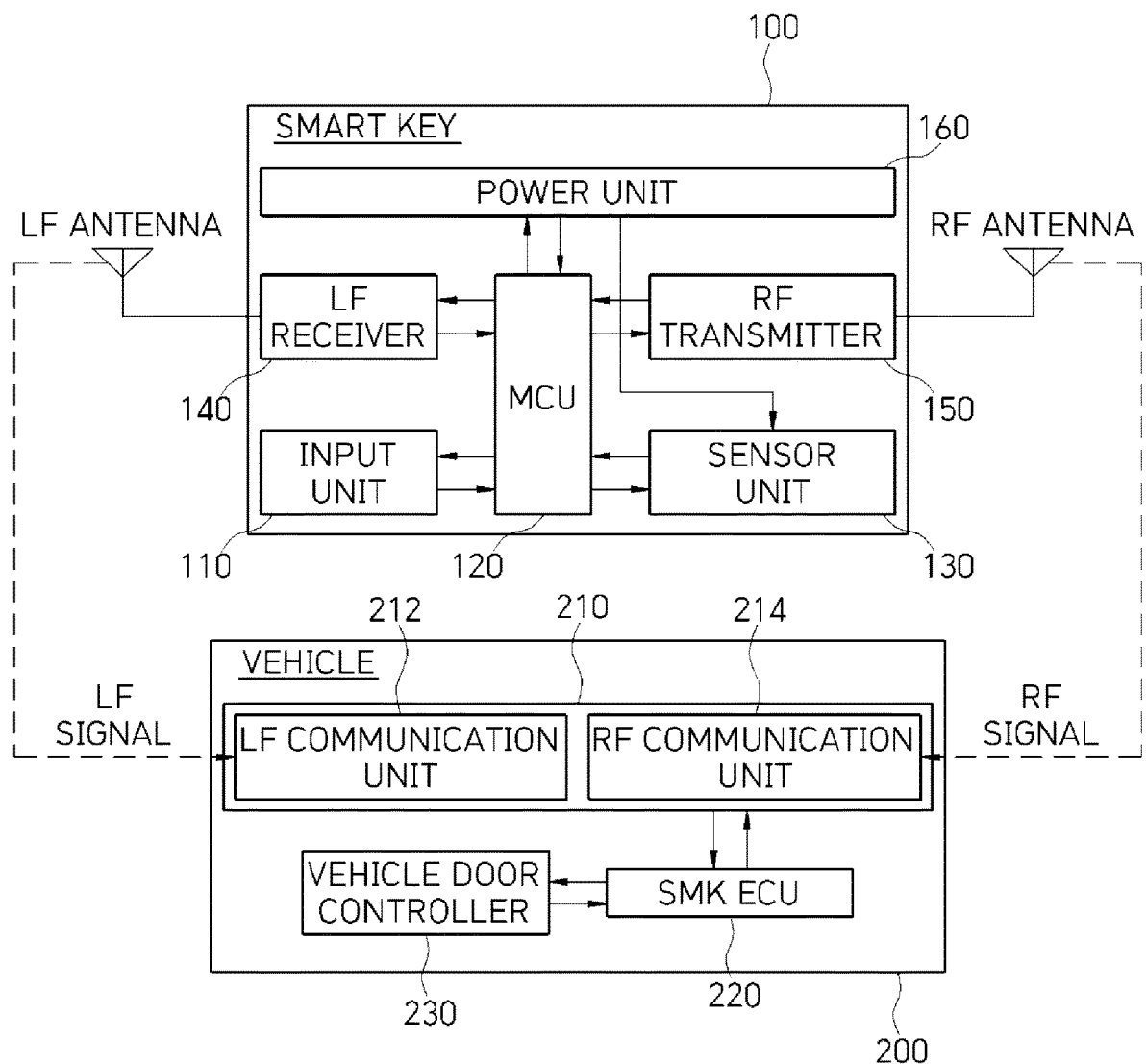
FIG. 7 is a block diagram illustrating a smart key according to another embodiment of the present invention.

FIG. 7 is a block diagram illustrating a smart key 100 according to another embodiment of the present invention.

Referring to FIG. 7, the smart key 100 according to another embodiment of the present invention may be the same as the smart key 100 illustrated in FIG. 1. The vehicle 200 communicating with the smart key 100 according to another embodiment of the present invention may further include a vehicle door controller 230.

The descriptions of FIG. 1 may be applied to elements of the smart key 100 illustrated in FIG. 7.

An SMK ECU 220 of the vehicle 200 may generate a command message representing getting in or getting out of the vehicle 200 in response to a vehicle door opening or closing signal input from the vehicle door controller 230.

The SMK ECU 220 may convert the generated command message into an LF signal and may transmit the LF signal to the smart key 100 through an LF communication unit 212.

The SMK ECU 220 may receive an RF signal from the smart key 100 through the vehicle communication unit 210 and may control an operation of the vehicle corresponding thereto.

Figure 8:
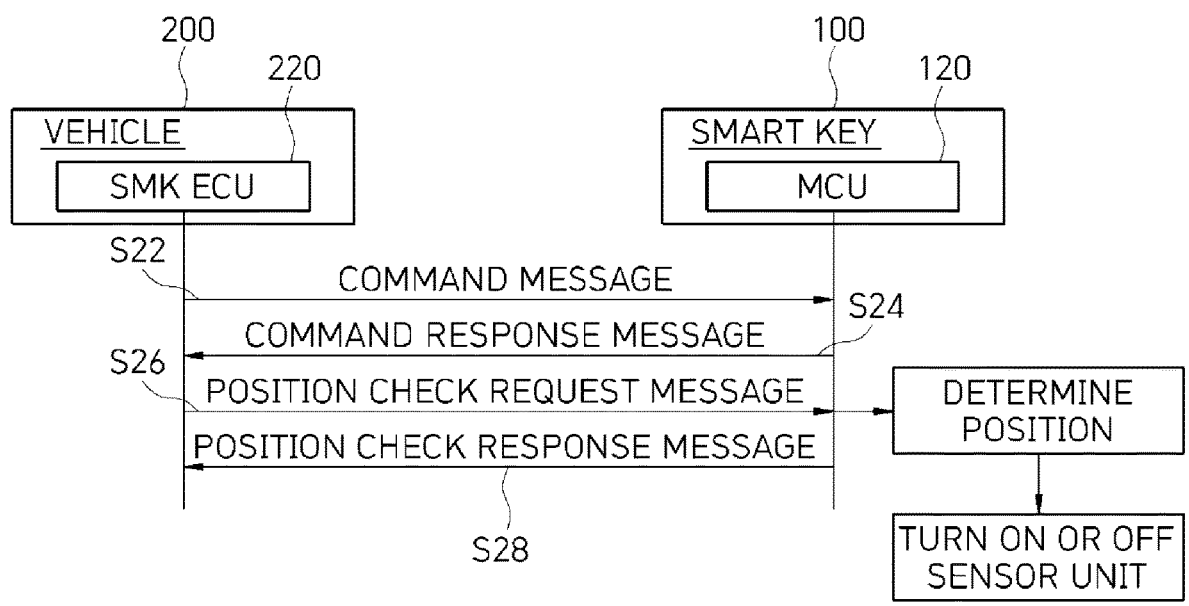
FIG. 8 is a message flowchart of a message transmitted and received between a vehicle and the smart key illustrated in FIG. 7.

FIG. 8 is a message flowchart of a message transmitted and received between a vehicle and the smart key illustrated in FIG. 7.

Referring to FIG. 8, in a method of controlling a smart key according to another embodiment of the present invention, in order to decrease power (a dark current) consumed by a sensor unit 130, the sensor unit 130 may not be normally turned on and may be turned on or off based on a get-in or get-out command message transmitted from a vehicle 200.

That is, the turn-on (ON) or turn-off (OFF) of the sensor unit 130 embedded into the smart key 100 may be changed there between by using, as a trigger, the get-in or get-out command message transmitted from the vehicle 200.

In detail, in step S22, the SMK ECU 220 may generate a command message representing getting in or getting out of the vehicle 200 on the basis of a vehicle door opening or closing signal input from a vehicle door controller 230, convert the command message into an LF signal, and transmit the LF signal to an MCU 120.

Subsequently, in step S24, the MCU 120 may generate a command response message corresponding to the command message included in the LF signal, convert the command response message into an RF signal, and transmit the RF signal to the SMK ECU 220.

Subsequently, when the command response message is received, the SMK ECU 220 may generate a position check request message, convert the position check request message into an LF signal, and transmit the LF signal to the MCU 120 in step S26.

Subsequently, the MCU 120 may generate a position check response message corresponding to the position check request message, convert the position check response message into an RF signal, and transmit the RF signal to the SMK ECU 220.

In step S26, when the MCU 120 receives the position check request message, the MCU 120 may determine a position of the smart key 100 in response to the position check request message, and based on the determined position, the MCU 120 may turn on the sensor unit 130. When the smart key 100 is at an indoor region of the vehicle, the MCU 120 may turn off the sensor unit 130.

Opening of a vehicle door may denote getting in or getting out of a user (a driver). Also, closing of the vehicle door may denote getting in or getting out of the vehicle of the user (the driver).

In order to accurately determine getting in or getting out of the vehicle of the user (the driver), a process of determining whether a position of the smart key 100 possessed by the user (the driver) is an indoor region or an outdoor region of the vehicle may be needed in addition to receiving the get-in or get-out command message.

The MCU 120 may compare an RSSI of the LF signal including the position check request message with predetermined reference strength to determine a position of the smart key 100.

The reference strength may be previously set to determine a position of the smart key 100. For example, the reference strength may include first reference strength and second reference strength which is set to be less than the first reference strength.

When the RSSI of the LF signal is equal to or greater than the first reference strength, the MCU 120 may determine that the smart key 100 is in an indoor region of the vehicle, and when the RSSI of the LF signal is less than the first reference strength and equal to or greater than the second reference strength, the MCU 120 may determine that the smart key 100 is outside the vehicle within a range enabling LF communication with the vehicle (an LF reception distance).

When the RSSI of the LF signal is less than the second reference strength, the MCU 120 may determine that the smart key 100 is outside the range enabling LF communication with the vehicle 300.

Figure 9:
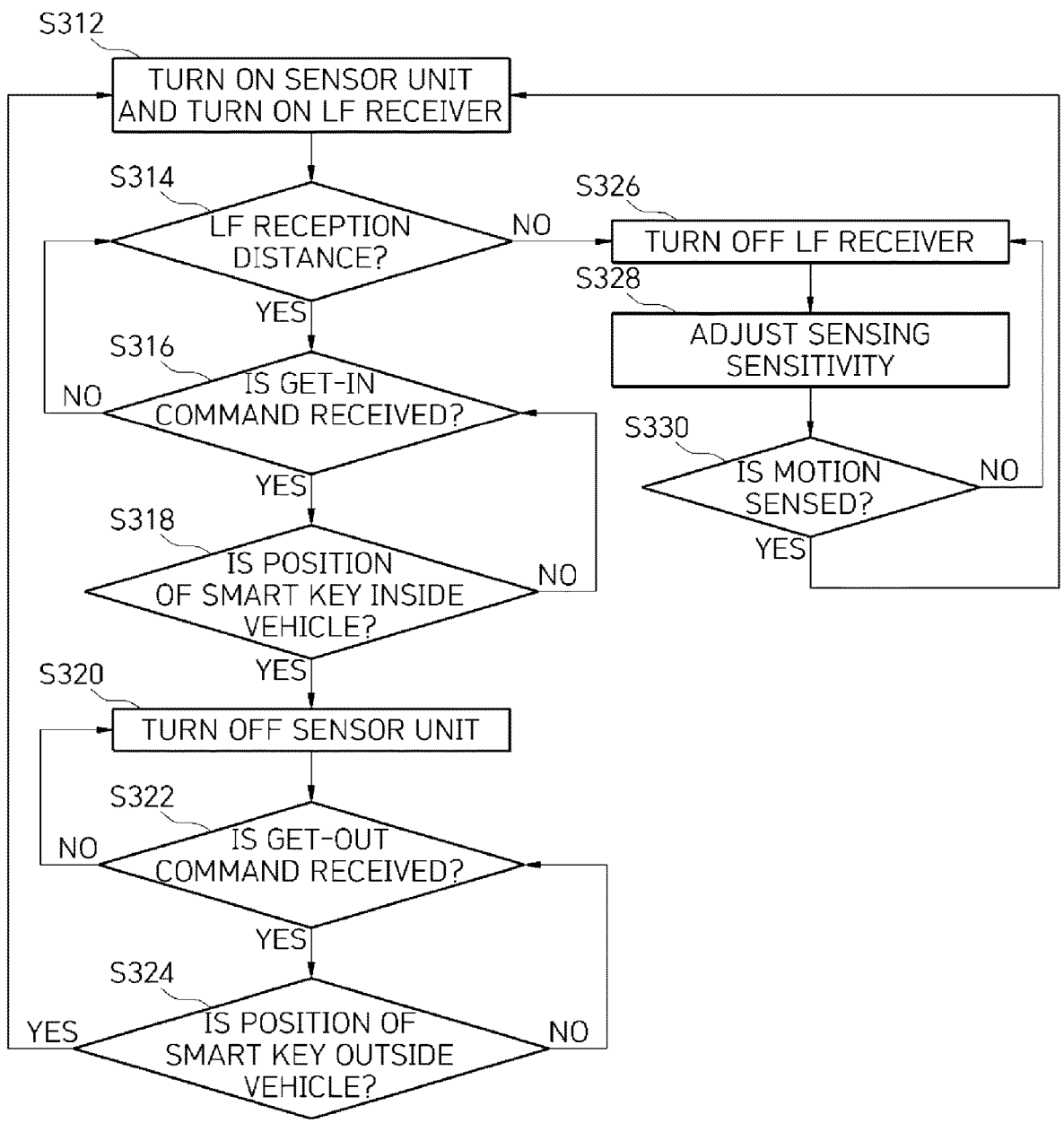
FIG. 9 is a flowchart illustrating a method of controlling a smart key according to another embodiment of the present invention.

FIG. 9 is a flowchart illustrating a method of controlling a smart key according to another embodiment of the present invention.

Referring to FIG. 9, first, in step S312, the sensor unit 130 and the LF receiver 140 may be in a normal ON state.

Subsequently, in step S314, the MCU 120 may compare an RSSI of an LF signal, transmitted from the vehicle, with predetermined reference strength to determine whether the smart key 100 is within a range enabling LF communication with the vehicle 300.

Figure 10:
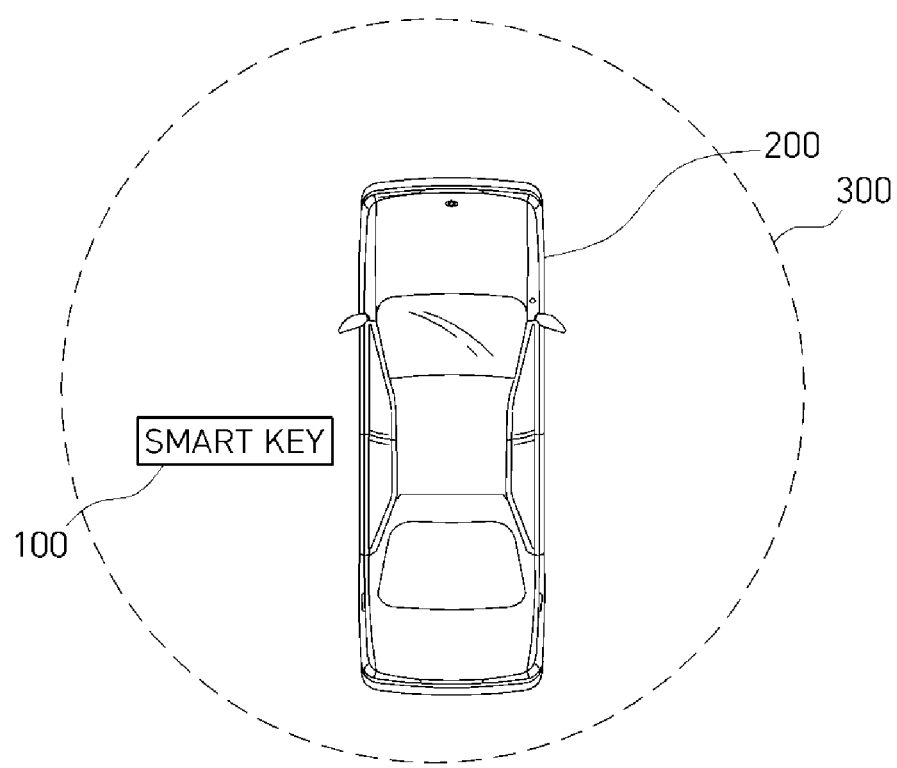
FIG. 10 is a diagram illustrating a situation where a smart key according to an embodiment of the present invention is disposed at an LF reception distance.
Figure 11:
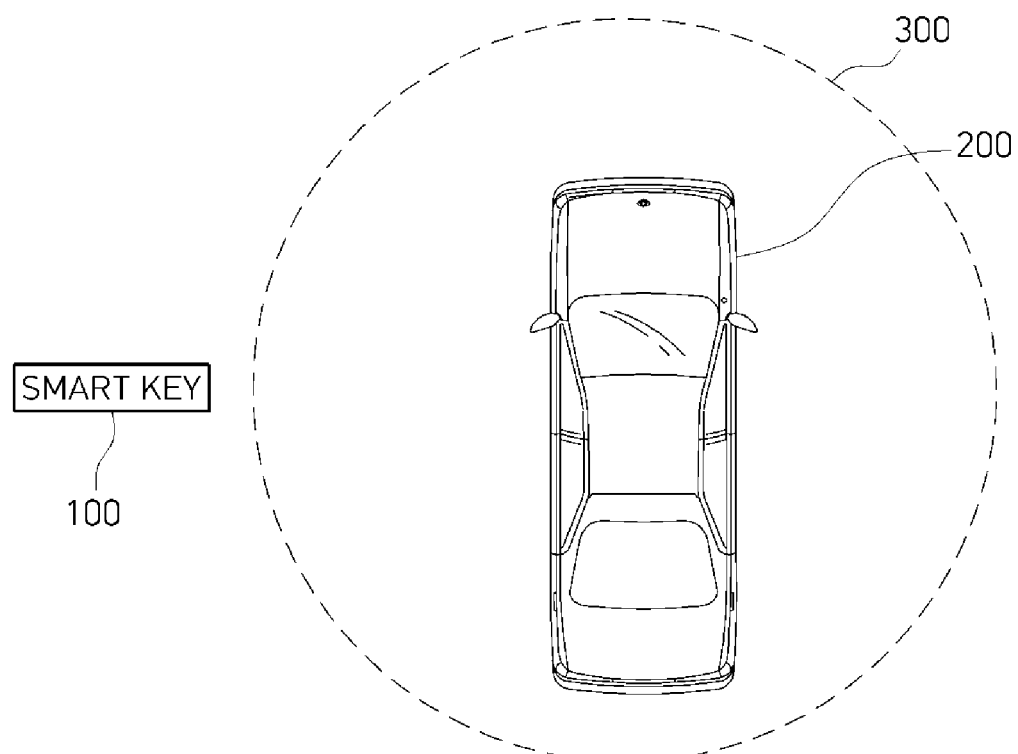
FIG. 11 is a diagram illustrating a situation where a smart key according to an embodiment of the present invention is disposed outside an LF reception distance.

For example, when the RSSI of the LF signal is less than the first reference strength and equal to or greater than the second reference strength, as illustrated in FIG. 10, the MCU 120 may determine that the smart key 100 is at an LF reception distance 300 in an outdoor region outside the vehicle. When the RSSI of the LF signal is less than the second reference strength, as illustrated in FIG. 11, the MCU 120 may determine that the smart key 100 is outside the LF reception distance.

When the smart key 100 is at the LF reception distance 300, the MCU 120 may move to step S316, and when the smart key 100 is outside the LF reception distance 300, the MCU 120 may move to step S326. First, step S326 will be described below.

In step S326, when it is determined that the smart key 100 is outside the LF reception distance 300, the LF receiver 140 may be changed from an ON state to an OFF state in response to a control command of the MCU 120.

Subsequently, in step S328, the MCU 120 may adjust sensing strength (sensing sensitivity) of the sensor unit 130, configured to minimize a dark current caused by the sensor unit 130. For example, the sensor unit 130 may measure a motion of the smart key 100 for a predetermined time to obtain measurement values and may transfer the measurement values to the MCU 120.

Subsequently, the MCU 120 may calculate an average value of the measurement values and may compare the average value with a predetermined reference value. When the average value is greater than the reference value, the MCU 120 may determine that the amount of motion of the user (the driver) possessing the smart key 100 is much, and thus, may generate a control command to decrease sensing sensitivity to second sensing sensitivity which is lower than initially-defaulted first sensing sensitivity and may transfer the control command to the sensor unit 130.

Subsequently, the sensing sensitivity of the sensor unit 130 may be changed from the first sensing sensitivity to the second sensing sensitivity in response to the control command of the MCU 120.

Changing of sensing sensitivity may denote that an internal sensing period, a sensing frequency, or a frequency of a sensing clock is changed. Although not illustrated, in order to change sensing sensitivity, for example, the sensor unit 130 may include a clock generator which generates a plurality of clocks having different frequencies and a multiplexer.

When the plurality of clocks are input to the multiplexer, the multiplexer may change sensing sensitivity by using a method of selecting a clock having a sensing frequency corresponding to the second sensing sensitivity from among the plurality of clocks by using the control command of the MCU 120 as a selection signal.

Even when sensing sensitivity is reduced from the first sensing sensitivity to the second sensing sensitivity, a sensing operation of the sensor unit 130 may not be affected. As described above, because a sufficient measurement result is collected when a motion of the smart key 100 is large, the motion of the smart key 100 may be normally sensed despite the reduced second sensing sensitivity.

Changing of sensing sensitivity may be periodically performed. Therefore, after a certain time elapses, when the average value of the measurement values obtained by measuring the motion of the smart key 100 is reduced to be equal to or less than the reference value, the MCU 120 may determine that a motion of the user (the driver) possessing the smart key 100 is reduced, and thus, the sensor unit 130 may restore sensing sensitivity to the initially-defaulted first sensing sensitivity. Accordingly, a small motion of the smart key 100 may be controlled not to be sensed as the second sensing sensitivity.

Subsequently, in step S330, the MCU 120 may determine motion or no motion of the smart key 100 by using the sensor unit 130 with adjusted sensing sensitivity.

When motion of the smart key 100 is checked, the MCU 120 may move to step S312 again and may change the LF receiver 140 to an ON state, and when motion of the smart key 100 is not checked, the MCU 120 may maintain an OFF state of the LF receiver 140.

That is, in steps S326, S328, and S330, only when the motion of the smart key 100 is sensed outside the LF reception distance 300, the LF receiver 140 may be changed from an OFF state to an ON state, and thus, battery consumption caused by the LF receiver 140 may be reduced. Also, when the motion of the smart key 100 is not sensed, the LF receiver 140 may be turned off, thereby preventing hacking such as an RSA.

The MCU 120 may return to step S314, and when it is determined that the smart key 100 is at the LF reception distance, the MCU 120 may check whether a get-in command message is received from the vehicle 200 (or the SMK ECU 220) in step S316.

When the get-in command message is not received, the MCU 120 may return to previous step S314.

Figure 12:
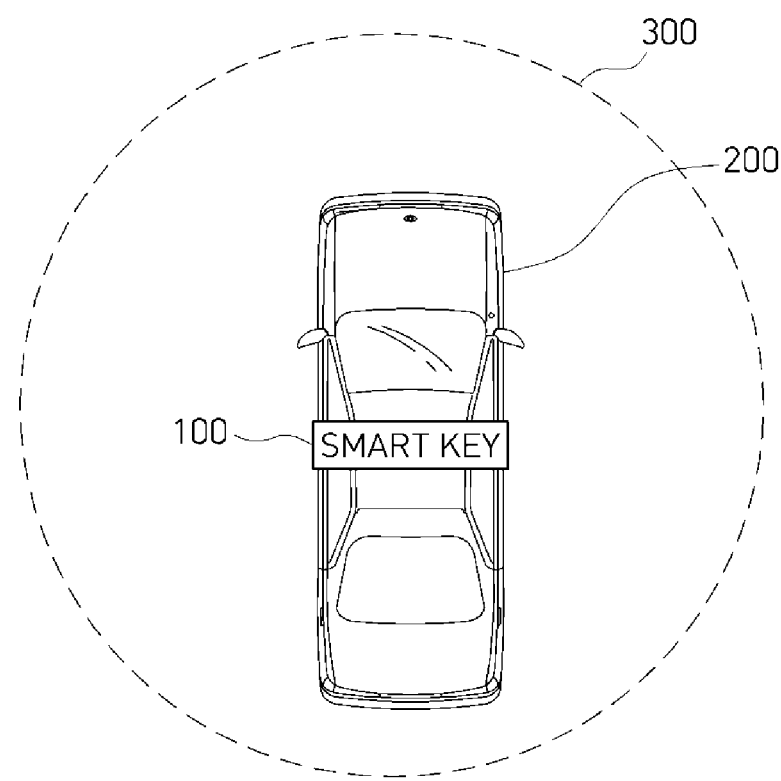
FIG. 12 is a diagram illustrating a situation where a smart key according to an embodiment of the present invention is disposed in an indoor region of a vehicle.

When reception of the get-in command message is checked, in step S318, the MCU 120 may compare reference strength with an RSSI of an LF signal including the get-in command message transmitted from the vehicle to check whether a position of the smart key 100 is in an indoor region of the vehicle as illustrated in FIG. 12.

As described above, because the getting in or not getting in of the vehicle of the user (the driver) is not determined based on only checking reception of the get-in command message, it may not be needed to check whether the smart key 100 is in an indoor region of the vehicle.

In a position check method, when the RSSI of the LF signal is equal to or greater than the first reference strength described above, it may be determined that the smart key 100 is in the indoor region of the vehicle. When a position of the smart key 100 is an outdoor position outside the vehicle, the MCU 120 may return to previous step S316.

When it is determined that the smart key 100 is in the indoor region of the vehicle, the sensor unit 130 may be changed from an ON state to an OFF state on the basis of the control command of the MCU 120 in step S320. As described above, when the smart key 100 is in the indoor region of the vehicle, the MCU 120 may turn off the sensor unit 130, thereby reducing battery consumption caused by the sensor unit 130.

Subsequently, in step S322, the MCU 120 may determine whether a get-out command message is received from the vehicle 200 (or the SMK ECU 220).

When it is determined that the get-out command message is not received, the MCU 120 may return to previous step S320, and the sensor unit 130 may continuously maintain an OFF state, thereby continuously decreasing battery consumption.

When it is determined by the MCU 120 that the get-out command message is received, the MCU 120 may compare the reference strength with an RSSI of an LF signal including the get-out command message to determine whether the smart key 100 is outside the vehicle in step S324.

As described above, because the getting in or getting out of the vehicle of the user (the driver) possessing the smart key 100 is not determined based on only checking reception of the get-out command message, it may be needed to check whether the smart key 100 is outside the vehicle.

A method of determining whether the smart key 100 is outside the vehicle may be similar to a determination method which is performed in step S318. For example, when it is determined that the RSSI of the LF signal including the get-out command message is less than the first reference strength and equal to or greater than the second reference strength, the MCU 120 may determine that the smart key 100 is outside the vehicle.

When it is determined that the smart key 100 is outside the vehicle and the user (the driver) has completely gotten out, the MCU 120 may return to initial step S312, and the sensor unit 130 may be changed from an OFF state to an ON state on the basis of a control command of the MCU 120.

As described above, according to another embodiment of the present invention, unlike the related art where the sensor unit 130 maintains a normal ON state, the sensor unit 130 may be turned off in getting out the vehicle, and in addition to preventing the occurrence of a dark current, battery consumption caused by the sensor unit 130 may be reduced, thereby improving the battery efficiency of the power unit 160.

Moreover, a dark current occurring due to the sensor unit 130 may be minimized by adaptively adjusting sensing strength (sensing sensitivity) of the sensor unit 130 in an outdoor region outside the vehicle, thereby improving battery efficiency. Here, a state where the sensing strength (sensing sensitivity) of the sensor unit 130 has been adjusted may include a state where the sensing strength (sensing sensitivity) is maintained outside the LF reception distance and a state where the sensing strength (sensing sensitivity) is maintained at the LF reception distance.

Therefore, it may not be understood that improvement of battery efficiency based on adjusting sensing strength (sensing sensitivity) is an effect obtained outside only the LF reception distance.

Moreover, in FIG. 9, it is illustrated that step S328 of adjusting sensing sensitivity is performed outside only the LF reception distance 300. However, the present embodiment is not limited thereto, and step S328 of adjusting sensing sensitivity may be performed even after the smart key 100 enters the LF reception distance 300. However, the sensor unit 130 may be turned off in an indoor region of the vehicle, and thus, it may not be needed to adjust sensing sensitivity in the indoor region of the vehicle.

In a related art smart key with a motion sensor embedded therein, because the sensor is normally turned on, battery consumption is large.

On the other hand, according to the embodiments of the present invention, an operation of a motion sensor and operations of an LF receiver and an RF transmitter may be appropriately controlled based on conditions, thereby improving battery efficiency.

Moreover, according to the embodiments of the present invention, the motion sensor may be turned off in an indoor portion of a vehicle, and in the outside of the vehicle, sensing strength (for example, sensing sensitivity, a sensing period, and a sensing frequency) may be adjusted to be low, thereby improving battery efficiency.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of controlling a smart key including a low frequency (LF) receiver receiving an LF signal from a vehicle, a radio frequency (RF) transmitter transmitting an RF signal to the vehicle in response to the LF signal, a sensor unit sensing a motion, and a micro control unit controlling operations of the LF receiver, the RF transmitter, and the sensor unit, the method comprising:
receiving, by the LF receiver, the LF signal from the vehicle; and
controlling, by the micro control unit, a turn-on/off operation of each of the LF receiver, the RF transmitter, and the sensor unit on the basis of the received LF signal.

2. The method of claim 1, wherein the controlling of the turn-on/off operation comprises:
determining whether the smart key is within a range enabling LF communication with the vehicle, based on a received signal strength indicator (RSSI) of the received LF signal; and
controlling the turn-on/off operation of each of the LF receiver, the RF transmitter, and the sensor unit on the basis of a result of the determination.

3. The method of claim 1, wherein the controlling of the turn-on/off operation comprises, when it is determined based on a received signal strength indicator (RSSI) of the received LF signal that the smart key moves to a position outside a range enabling LF communication with the vehicle, controlling the sensor unit from an OFF state to an ON state, controlling the RF transmitter from an ON state to an OFF state, and maintaining the LF receiver in an ON state.

4. The method of claim 1, wherein the controlling of the turn-on/off operation comprises, when it is determined based on a received signal strength indicator (RSSI) of the received LF signal that the smart key is outside a range enabling LF communication with the vehicle, controlling the sensor unit and the LF receiver to an ON state and controlling the RF transmitter to an OFF state.

5. The method of claim 4, wherein the controlling of the turn-on/off operation comprises, when a button input of a user occurs through an input unit, controlling the RF transmitter from the OFF state to the ON state.

6. The method of claim 1, wherein the controlling of the turn-on/off operation comprises, when it is determined based on a received signal strength indicator (RSSI) of the received LF signal that the smart key does not enter a range enabling LF communication with the vehicle for a predetermined time, controlling the LF receiver from an ON state to an OFF state.

7. The method of claim 1, wherein the controlling of the turn-on/off operation comprises, when it is determined based on a received signal strength indicator (RSSI) of the received LF signal that the smart key is outside a range enabling LF communication with the vehicle for a predetermined time, controlling the LF receiver to an ON state in a case where the sensor unit senses a motion of the smart key.

8. The method of claim 1, wherein the controlling of the turn-on/off operation comprises:
in a case where it is determined based on a received signal strength indicator (RSSI) of the received LF signal that the smart key is outside a range enabling LF communication with the vehicle,
when a measurement value of a motion of the smart key measured by the sensor unit is less than a reference value, determining that the motion of the smart key is small and adjusting sensing sensitivity of the sensor unit to first sensing sensitivity; and
when the measurement value is equal to or greater than the reference value, determining that the motion of the smart key is much and adjusting the sensing sensitivity of the sensor unit to second sensing sensitivity which is less than the first sensing sensitivity.

9. A method of controlling a smart key including a low frequency (LF) receiver receiving an LF signal from a vehicle, a radio frequency (RF) transmitter transmitting an RF signal to the vehicle in response to the LF signal, a sensor unit sensing a motion, and a micro control unit controlling operations of the LF receiver, the RF transmitter, and the sensor unit, the method comprising:
receiving, by the LF receiver, the LF signal including a command message representing opening or closing of a vehicle door from the vehicle; and
controlling, by the micro control unit, a turn-on/off operation of the sensor unit sensing a motion of the smart key on the basis of the LF signal.

10. The method of claim 9, wherein the controlling of the turn-on/off operation of the sensor unit comprises:
determining whether a position of the smart key is in an indoor region of the vehicle, based on a received signal strength indicator (RSSI) of the LF signal; and
when it is determined that the position of the smart key is in the indoor region of the vehicle, controlling the sensor unit from an ON state to an OFF state.

11. The method of claim 9, wherein the controlling of the turn-on/off operation of the sensor unit comprises:
determining whether a position of the smart key is outside the vehicle, based on a received signal strength indicator (RSSI) of the LF signal; and
when it is determined that the position of the smart key is outside the vehicle, controlling the sensor unit from an OFF state to an ON state.

12. The method of claim 9, wherein the controlling of the turn-on/off operation of the sensor unit comprises:
when it is determined based on a received signal strength indicator (RSSI) of the received LF signal that the smart key is outside a range enabling LF communication with the vehicle, controlling the LF receiver from an ON state to an OFF state.

13. The method of claim 12, wherein the controlling of the turn-on/off operation of the sensor unit further comprises:
when it is determined based on the received signal strength indicator (RSSI) of the received LF signal that the smart key is outside the range enabling LF communication with the vehicle, controlling the OFF state-controlled LF receiver from the OFF state to the ON state in a case where the sensor unit senses the motion of the smart key.

14. A method of controlling a smart key including a low frequency (LF) receiver receiving an LF signal from a vehicle, a radio frequency (RF) transmitter transmitting an RF signal to the vehicle in response to the LF signal, a sensor unit sensing a motion, and a micro control unit controlling operations of the LF receiver, the RF transmitter, and the sensor unit, the method comprising:
receiving, by the LF receiver, the LF signal from the vehicle; and
controlling, by the micro control unit, a turn-on/off operation of each of the LF receiver, the RF transmitter, and the sensor unit on the basis of a received signal strength indicator (RSSI) of the received LF signal and a command message which represents opening or closing of a vehicle door and is included in the received LF signal.

15. The method of claim 14, wherein the controlling of the turn-on/off operation further comprises:
when it is determined based on the RSSI of the received LF signal that the smart key is outside a range enabling LF communication with the vehicle, controlling the sensor unit and the LF receiver to an ON state and controlling the RF transmitter to an OFF state.

16. The method of claim 14, wherein the controlling of the turn-on/off operation further comprises:
when it is determined based on the RSSI of the received LF signal that the smart key does not enter a range enabling LF communication with the vehicle for a predetermined time, controlling the LF receiver from an ON state to an OFF state.

17. The method of claim 14, wherein the controlling of the turn-on/off operation comprises, when it is determined based on the RSSI of the received LF signal that the smart key is outside a range enabling LF communication with the vehicle for a predetermined time, controlling the LF receiver to an ON state in a case where the sensor unit senses a motion of the smart key.

18. The method of claim 14, wherein the controlling of the turn-on/off operation comprises:
determining whether a position of the smart key is in an indoor region of the vehicle, based on the RSSI of the LF signal; and
when it is determined that the position of the smart key is in the indoor region of the vehicle, controlling the sensor unit from an ON state to an OFF state.

19. The method of claim 14, wherein the controlling of the turn-on/off operation of the sensor unit comprises:
determining whether a position of the smart key is outside the vehicle, based on the RSSI of the LF signal; and
when it is determined that the position of the smart key is outside the vehicle, controlling the sensor unit from an OFF state to an ON state.

* * * * *